US012740909B2

(12) United States Patent
Yeow et al.

(10) Patent No.: US 12,740,909 B2
(45) Date of Patent: Sep. 22, 2026

(54) ACTUATOR ARRAY AND AN EXOSKELETON HAVING THE SAME

(71) Applicant: NATIONAL UNIVERSITY OF SINGAPORE, Singapore (SG)

(72) Inventors: Chen Hua Yeow, Singapore (SG); Rainier Florentin Natividad, Singapore (SG)

( * ) Notice: Subject to any disclaimer, the term of this patent is extended or adjusted under 35 U.S.C. 154(b) by 1295 days.

(21) Appl. No.: 17/595,317

(22) PCT Filed: May 15, 2020

(86) PCT No.: PCT/SG2020/050286
§ 371 (c)(1),
(2) Date: Nov. 15, 2021

(87) PCT Pub. No.: WO2020/231344
PCT Pub. Date: Nov. 19, 2020

(65) Prior Publication Data
US 2022/0211566 A1 Jul. 7, 2022

(30) Foreign Application Priority Data
May 16, 2019 (SG) ......................... 10201904434W

(51) Int. Cl.
*A61H 1/02* (2006.01)
*B25J 9/00* (2006.01)

(52) U.S. Cl.
CPC ......... *A61H 1/0281* (2013.01); *A61H 1/0237* (2013.01); *B25J 9/0006* (2013.01);
(Continued)

(58) Field of Classification Search
CPC .... B25J 9/14; B25J 9/142; B25J 13/08; F15B 15/10; F15B 15/103; F15B 5/012;
(Continued)

(56) References Cited

U.S. PATENT DOCUMENTS

2006/0270290 A1* 11/2006 Tellew ...................... B63C 9/18 441/88
2014/0318118 A1* 10/2014 Mazzeo .................. B25J 9/142 60/527
(Continued)

FOREIGN PATENT DOCUMENTS

CN 108326828 A 7/2018
JP 2007282991 A * 11/2007 ............ B25J 9/0006
(Continued)

OTHER PUBLICATIONS

Machine translation of JP-2007282991-A. Accessed from PE2E on Apr. 2026. (Year: 2007).*
(Continued)

*Primary Examiner* — Joseph D. Boecker
*Assistant Examiner* — Jaeick Jang
(74) *Attorney, Agent, or Firm* — PatShegen IP; Moshe Pinchas

(57) ABSTRACT

An actuator array includes an elongated base and a plurality of pneumatic actuator elements removably attached to the base. The base is made of a pliant and inextensible material. The actuator elements are configured to be inflated and interfere with each other in use to generate a bending motion supported by the base. At least one parameter associated with the actuator elements is selected to control a three-dimensional (3-D) profile of the bending motion.

5 Claims, 16 Drawing Sheets

(52) U.S. Cl.
CPC ................ *A61H 2201/0103* (2013.01); *A61H 2201/1238* (2013.01); *A61H 2201/1614* (2013.01); *A61H 2201/165* (2013.01); *A61H 2201/5056* (2013.01)

(58) Field of Classification Search
CPC ..... A61F 5/012; A61H 1/0281; A61H 1/0288; A61H 1/0237–0285; A61H 2201/1409; A61H 2201/1238
See application file for complete search history.

(56) References Cited

U.S. PATENT DOCUMENTS

| | | | | |
|---|---|---|---|---|
| 2015/0224012 | A1* | 8/2015 | Wright | A61H 9/0078 601/150 |
| 2015/0309563 | A1* | 10/2015 | Connor | A61B 5/1071 73/865.4 |
| 2017/0109560 | A1 | 4/2017 | Chen et al. | |
| 2017/0290681 | A1 | 10/2017 | Mosadegh et al. | |
| 2018/0079071 | A1* | 3/2018 | Griffith | B25J 9/0006 |
| 2018/0303698 | A1 | 10/2018 | Wijesundara et al. | |
| 2020/0023927 | A1* | 1/2020 | Gruentzig | B63C 9/18 |
| 2020/0170873 | A1* | 6/2020 | Walsh | B25J 9/0006 |
| 2021/0155353 | A1* | 5/2021 | Miller | B25J 9/0006 |
| 2022/0410369 | A1* | 12/2022 | Samlali | B25J 9/142 |

FOREIGN PATENT DOCUMENTS

| | | | |
|---|---|---|---|
| WO | 2018136004 | A1 | 7/2018 |
| WO | 2018188480 | A1 | 10/2018 |
| WO | 2018222930 | A1 | 12/2018 |

OTHER PUBLICATIONS

ISR; Intellectual Property Office of Singapore; Singapore; Sep. 4, 2020.

* cited by examiner

A
1100
1106
1206
1204

ACTUATOR ARRAY AND AN EXOSKELETON HAVING THE SAME

TECHNICAL FIELD

The present disclosure relates broadly, but not exclusively, to an actuator array, to an exoskeleton or garment article having at least one such actuator array, to a method of generating a bending motion, and to a method of mechanically assisting a user.

BACKGROUND

Exoskeletons were originally developed and intended for industrial and military uses, but have recently been applied for clinical use. For example, clinical upper-limb exoskeletons may be used to treat disorders that inhibit shoulder movement and hinder a person's ability to perform activities of daily living (ADLs). Typically, these exoskeletons are constructed using techniques pioneered in industrial robotics. For example, rigid, electric motors are placed concentrically with the humeral head while rigid links are attached parallel to the humerus, connecting the motors to the arm. In order to account for scapulohumeral rhythm, these exoskeletons must translate the position of the motors during shoulder movement. Alternatively, designers also employ an additional link in order to account for translation of the humeral head, but the addition of such a link can increase the likelihood of joint misalignment. Moreover, these designs are massive relative to the weight of a human user, adding unwanted inertia to the arm and restricting the mobility of the user.

In contrast to traditional robotic designs, soft robotics utilizes naturally flexible materials both as prime movers and structural links. This type of robotics behaves similar to continuum structures as compared to a system of rigid bodies that typically characterize traditional robots. Soft robots can be created in various forms, with each form having its own method of power transmission, such as cable-driven devices, shape-memory actuators, combustion devices, magnetism devices, and pressurized fluids. The inherent compliance and utilization of non-rigid power transmission elements has enabled soft robots to more closely emulate the movement of humans or animals. They are uniquely suited to power robotic exoskeletons due to their compliance, which results in the ability to conform to the external structure of the human body, and accurately follow the movement of the shoulder complex. Cable-driven exoskeletons most closely mimic the structure of the muscular system but require accurate positioning of anchor points. Meanwhile, pressurized fluids, specifically compressed air, have proven to be a popular choice for shoulder exoskeletons. However, most existing fluidic exoskeletons are incapable of providing sufficient mobility.

It may be desirable to provide device, systems and methods that can address at least some of the above problems.

SUMMARY

An aspect of the present disclosure provides an actuator array. The actuator array comprises an elongated base, wherein the base comprises a pliant and inextensible material; and a plurality of pneumatic actuator elements removably attached to the base. The actuator elements are configured to be inflated and interfere with each other in use to generate a bending motion supported by the base. At least one parameter associated with the actuator elements is selected to control a three-dimensional (3-D) profile of the bending motion.

The at least one parameter may comprise relative sizes of adjacent actuator elements. Alternatively or in addition, the at least one parameter may comprise shapes of adjacent actuator elements. Alternatively or in addition, the at least one parameter may comprise a spatial distribution of the actuator elements on the base. Alternatively or in addition, the at least one parameter may comprise relative elasticities of adjacent actuator elements.

The actuator elements may be independently operable. For example, each actuator element may comprise a respective valve for controlling an inflation pressure.

Another aspect of the present disclosure provides an exoskeleton comprising at least one actuator array as described, wherein the exoskeleton is configured to be mounted to a user to generate a continuous 3-D trajectory.

The actuator elements may be configured to generate the bending motion adjacent a joint of the user and substantially no bending motion along a body or limb section of the user.

The exoskeleton may comprise at least two actuator arrays connected in series.

Alternatively, the exoskeleton may comprise at least two actuator arrays connected in parallel. The at least two actuator arrays may be arranged in an antagonistic pattern.

In one embodiment, the exoskeleton may comprise a 2 degree-of-freedom shoulder exoskeleton. In another embodiment, the exoskeleton may comprise a lower body exoskeleton. In another embodiment, the exoskeleton may comprise a full body exoskeleton.

Another aspect of the present disclosure provides a method of generating a bending motion. The method comprises providing an actuator array comprising an elongated base and a plurality of pneumatic actuator elements removably attached to the base, wherein the base comprises a pliant and inextensible material; supplying a pressurized fluid to inflate the actuator elements such that adjacent actuator elements interfere with each other to generate a bending motion, wherein the bending motion is supported by the base; and controlling at least one parameter associated with the actuator elements to control a three-dimensional (3-D) profile of the bending motion.

Controlling at least one parameter may comprise selecting relative sizes of adjacent actuator elements. Alternatively or in addition, controlling at least one parameter may comprise selecting shapes of adjacent actuator elements.

Alternatively or in addition, controlling at least one parameter may comprise selecting a spatial distribution of the actuator elements on the base. Alternatively or in addition, controlling at least one parameter may comprise selecting relative elasticities of adjacent actuator elements.

Supplying the pressurized fluid to inflate the actuator elements may comprise operating the actuator elements independently of one another.

Another aspect of the present disclosure provides a method of mechanically assisting a user, comprising mounting an exoskeleton as described to the user, and operating the at least one actuator array to generate the bending motion.

Operating the at least one actuator array may comprise synchronising inflation of selected actuator elements with a limb or body movement of the user to reduce a load on the user's muscles.

Another aspect of the present disclosure provides a garment article comprising at least one actuator array as described, at least one sensor, and a processor communicatively coupled to the at least one actuator array and the at least one sensor. The processor is configured to control the bending motion of the at least one actuator array based on an input from the at least one sensor.

The garment article may be a set of fabric-based overalls. Alternatively, the garment article may be a pair of fabric-based shoulder sleeves.

BRIEF DESCRIPTION OF THE DRAWINGS

Embodiments of the disclosure will be better understood and readily apparent to one of ordinary skill in the art from the following written description, by way of example only, and in conjunction with the drawings, in which.

DETAILED DESCRIPTION

Figure 1:
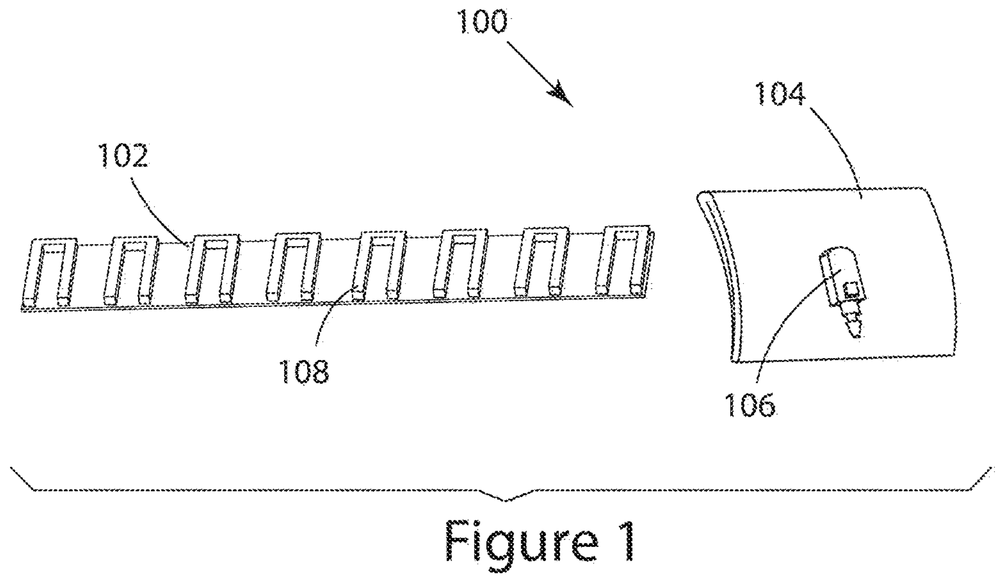
FIG. 1 shows a base and an actuator element of an actuator array according to an example embodiment.

The following detailed description is merely exemplary in nature and is not intended to limit the disclosure or the application and uses of the disclosure. Furthermore, there is no intention to be bound by any theory presented in the preceding background or the following detailed description.

The present disclosure describes devices and methods that make use of pneumatic soft actuators. An actuator array according to example embodiments includes a plurality of pneumatic actuator elements (e.g. modular inflatable bladders) attached to a flexible but inextensible base (also referred hereinafter as spine). In use, a fluid such as compressed air is injected into the individual bladders, and the expansion of the bladders causes them to push against each other and thus creates a bending motion.

In a non-limiting example implementation, both the actuator elements and the base are made out of plastic-backed fabrics. The fabrics are constructed through a combination of Fused Deposition Modeling (FDM), a subtype of three-dimensional (3-D) printing, and origami. Plastic structures are first 3-D printed onto the fabric. The fabric is then folded, and heat-sealed according to the intended inflation geometry. The plastic backing of the fabric facilitates both the 3-D printing process by providing a layer on which melted plastic can attach to, and the origami process by creating sections which melt and seal upon the application of heat and pressure. The FDM is used to create plastic structures onto the fabric, and these structures can serve as attachment sites and fluid inlets for the bladders.

The modular nature of the actuator array according to example embodiments enables the user to easily alter the size and pattern of the actuator array, thereby altering the bending characteristics. Therefore, it allows the user to customize the actuation direction, force and torque of the actuator array in order to suit various applications. Moreover, the bladders are fully structurally and pneumatically independent from each other, thus allowing the actuator array to be displaced outside its plane of bending. While a single actuator element itself only offers a single degree-of-freedom, the synergistic application of multiple actuator elements allows the array to perform 3-D bends. The actuator elements are particularly useful in creating soft robotic exoskeletons due to their soft nature, modularity, and ability to perform 3-D bends. 3-D bending may be integral in assisting multiple degrees of freedom (multi-DOF) joints such as the human shoulder or the hip, while modularity is necessary to allow the exoskeleton to adapt to a user's unique measurements. Moreover, modularity allows users to change the mechanical and kinematic characteristics of the actuator elements on the fly, giving their soft devices greater adaptability.

Example implementations of the present devices and methods are described in more details below with reference to the development, operation and evaluation of a prototype system and example exoskeleton applications.

Figure 2:
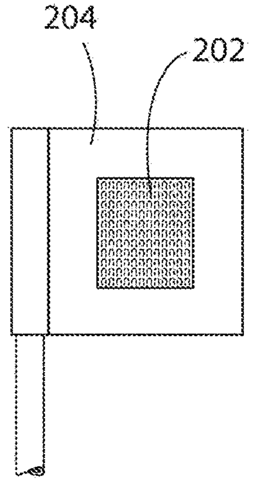
FIG. 2 shows an alternate attachment mechanism for the actuator element.

FIG. 1 shows a base 102 and an actuator element 104 of an actuator array 100 before assembly according to an example embodiment. The actuator array 100, which can be used in a modular, three-dimensional bending robotic device, converts a pneumatic input to a bending moment output. When assembled, the actuator array 100 includes a plurality of actuator elements 104 (e.g. pneumatic bladders) removably attached to a flexible (i.e. pliant) but inextensible base 102. In one implementation, attachment is effected by sliding a first mating part 106 on the actuator element 104 to lock with a corresponding second mating part 108 on the base 102. It will be appreciated that other attachment mechanisms are possible in alternate embodiments. These may include clothing buttons, riveted buttons, zippers and the like. For example, as shown in FIG. 2, a hook-based fastener (e.g. Velcro) 202 that is secured to an actuator element 204 may be attached on a fabric sheet covered with loop material. In this manner, the actuator element 204 can be installed by pressing it down, or removed by peeling it off.

Figure 3:
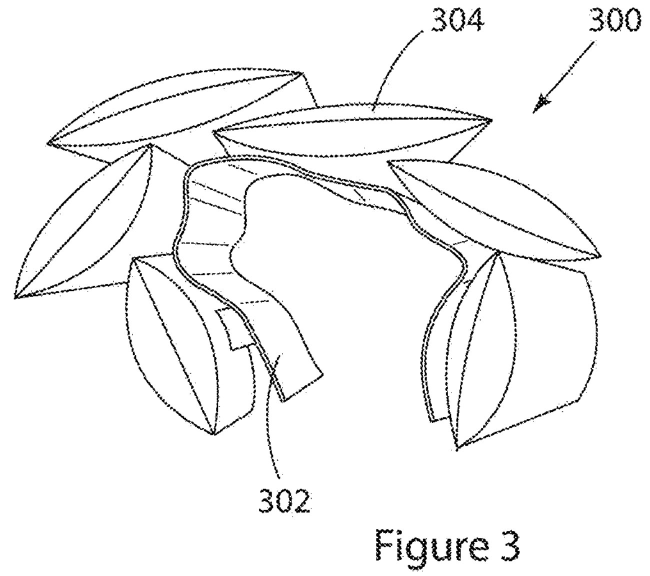
FIG. 3 shows an actuator array according to an example embodiment, with the actuator elements activated.

FIG. 3 shows an actuator array 300 with a base 302 and actuator elements 304 in an activated state according to an example embodiment. Activation of the actuator elements 304 may be executed by the introduction of a pressurized fluid (e.g. air) supplied from an external source. Example external sources can range from portable diaphragm pumps for light scale applications, to industrial piston-type compressors for heavy-duty tasks. Upon inflation, the previously separated actuator elements 304 press against each other or unfold, and the interference between the actuator elements

304 induces an internal bending moment. Notably, the resulting bending motion has a three-dimensional (3D) profile. The 3D profile can be suitably controlled by selecting at least one parameter associated with the actuator elements 304. Moreover, each pneumatic actuator element 304 can be independently inflated as indicated by a specific design, e.g. by supplying different pressures to the actuator elements 304 in the array. The use of independent actuator elements also allows for the installation of dissimilar actuator elements (e.g. different sizes and/or shapes), allowing a device to feature an irregular bending shape even if every actuator element is inflated to equal pressures. Such a feature can be useful in the creation of pneumatic exoskeletons, where bending is only desired around the joints, and a more rigid structure is necessary in areas attached to the limbs.

In one implementation, the base and actuator elements are each primarily made of a Nylon sheet coated with thermoplastic polyurethane (TPU) on both sides. Nylon is the primary structural component of the parts while TPU facilitates fabrication by providing a layer that can be melted and heal-sealed. Fabrication begins by directly generating 3-D printed structures (mating parts 106 and 108 in FIG. 1) onto the sheets. The sheets are mounted on a fused deposition modelling (FDM) 3-D printer (Lulzbot, Taz 6). Direct 3-D printing onto the sheets allows for highly repeatable fabrication process, whereas a manual attachment of these structures may introduce unwanted variability in the quality of the actuator elements. A double-sided adhesive tape is placed on the perimeter of the sheets. The print bed must be heated to a minimum temperature of 60° C. in order to ensure proper adhesion of the tape. The height of the nozzle is set to 0.50 mm above the surface of the Nylon sheet. The structures (mating parts 106 and 108) are then printed normally using a flexible TPU-based filament (Polyflex, Polymaker). The use of a TPU-based filament is necessary in order to prevent delamination of the structures from the sheets during operation since the TPU filament bonds exceptionally well to the TPU coat of the sheet. In other words, the TPU coating on the fabric allows for a strong and stable bond of the structures onto the fabric due to the similar melting temperature of the 3-D printed material, and the TPU coat. The sheets are then cut to size based on the size of the actuator elements.

At this stage, the base is complete and ready for use while the sheets forming the actuator elements are further processed. For each sheet, a hole is drilled on the under-side of the sheet to provide a fluid path from the 3-D printed structure (mating part 106) onto the actuator element eventually formed. The sides are then heat-sealed (e.g. using a hand iron, hair straightener, ultrasonic welder, heat press) to form a pocket, with the 3-D printed structure positioned inside. A paper-based tape is used to cover the sealing area in order to prevent the TPU on the external side from sticking to the sealer. The pocket is then flipped inside-out and a third seal is placed on the top to form an air-tight bladder. When deflated, the actuator elements resemble a rectangle with a single seam along one edge (see FIG. 1). The completed actuator elements and base are then assembled to form the actuator array based on functional requirements. In some configurations, fabric straps may be placed along the center of the actuator elements to prevent unnecessary inflation along the central area which typically does not interact with adjacent actuator elements, and to minimise the risk of the actuator elements being dislodged from the base.

In its neutral deflated state, the adjacent actuator elements fold up on the sides. The actuator elements behave as continuum structures when pressurized. The folded-up actuator elements inflate and spatially interfere with adjacent actuator elements. When unloaded and unattached to external structures, the actuator array curls into a smooth spiral shape until each actuator element is tangential to its adjacent elements (i.e. barely in contact with adjacent elements). The separated structure of the actuator elements, as well as the fabric spine and the absence of side seams, can provide substantial 3-D flexibility to the actuator array. This enables the actuator array to perform tight 3-D bends while still maintaining its torque output in its active axis of rotation. The ability to perform 3-D bends allows actuator arrays of an exoskeleton to combine their directions of motions while the modular feature of the actuator arrays allows each to reposition its midpoint so that the exoskeleton may be adjusted to each user.

Figure 4:
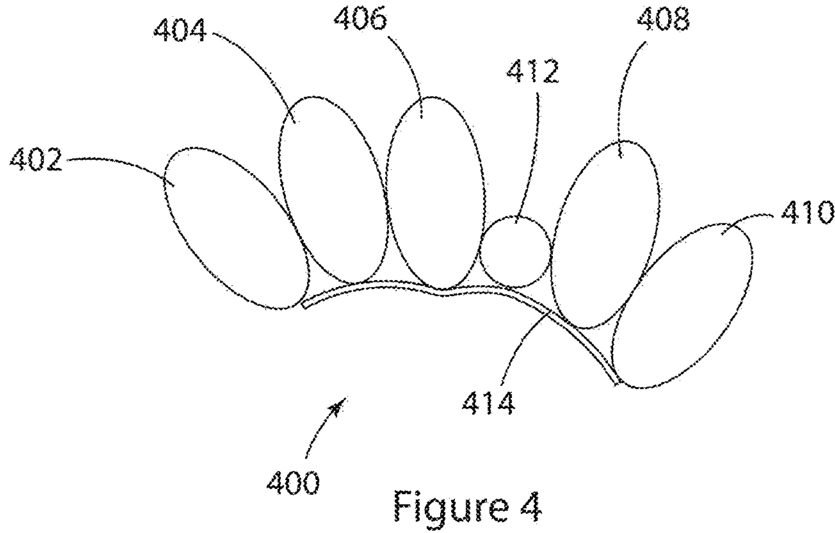
FIG. 4 shows a schematic diagram of a cross-section of an actuator array according to an example embodiment.

Moreover, the actuator array in example embodiments can be highly modular such that a common base can accommodate different designs or configurations of inflatable actuator elements. A user can change the performance of the actuator array by replacing certain members of the array with actuator elements, or a combination of different actuator elements, that feature a more appropriate shape (e.g. oval, triangular, circular), size (small, medium or large) or material property (varying elasticities). Alternatively or in addition, the spatial distribution of the actuator elements (e.g. relative distances between the elements and/or relative positions of the elements on the base) can be varied. Increasing the actuator element size at a location on the array can decrease the curvature radius at that area while decreasing actuator element size can increase the radius. This in turn allows the creation of a multi-radial curve as opposed to a purely circular shape, for example. FIG. 4 shows a schematic diagram of an actuator array 400 with dissimilar actuator elements. Here, actuator elements 402, 404, 406, 408 and 410 have a generally elliptical cross-section when inflated, while actuator element 412 has a generally circular cross-section when inflated. In addition, actuator element 412 is relatively smaller than actuator elements 402, 404, 406, 408 and 410. As a result, the curvature formed by base 414 has sections of different radii, as can be seen in FIG. 4.

As mentioned above, the configuration of the actuator elements in example embodiments allows them to be activated individually. For example, a respective valve is provided for each element to control the pneumatic input. Localized variation of air pressure in selected pneumatic actuator elements along the array can result in inflated elements of various sizes. By doing so, the bending mode can be controlled without the need to perform any structural modifications on the actuator array. In addition, this feature allows the implementation of an inflation algorithm such that the control and synchronization of the various segments of the actuator array may allow the actuator array to perform complex motions beyond simple bending or extension (e.g. walking, jumping).

Figure 5:
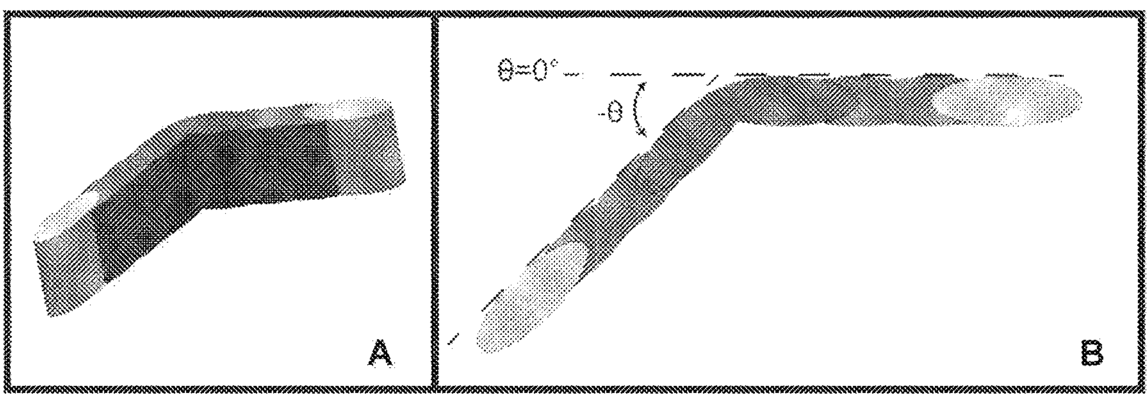
FIGS. 5A-5B show a model of an actuator array.

In order to further understand the principle of operation of the actuator array, a model was created. The actuator array generates force, and subsequently torque, through the spatial interference between adjacent actuator elements (also referred to in the present disclosure as modules). There are n elements installed in each actuator array, with n/2+1 intersecting pairs. Each $j^{th}$ pair includes the $i^{th}$ and $(i+1)^{th}$ elements. Each module pair generates its own force ($\vec{F}_j$) depending on the nature of the intersection of the elements, as well their interaction with the environment, and subsequently contributes to the overall torque produced by the actuator array. This means that an actuator array's torque output may differ depending on the topology of the object to which it is attached. The model simulates an actuator array's attachment to the human shoulder and assumes that the actuator array is bent at the center, while the remaining elements remain straight. In their inflated state, the actuator elements can effectively be considered as an extruded ellipse (FIGS. 5A-5B) with the lengths of the minor and major axes to be equal to half of the element's inflated height ($H_i$) and length ($L_i$).

Figure 6:
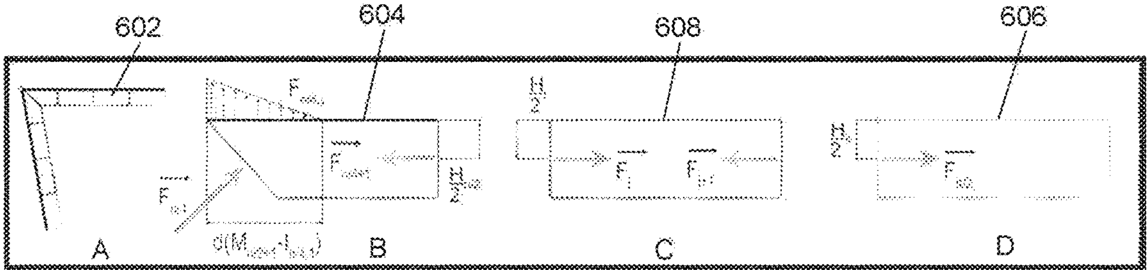
FIGS. 6A-6D show schematic free-body diagrams of different sections of the actuator array of FIGS. 5A-5B.

FIGS. 6A-6D show the free-body diagrams upon which the rest of the model is based. In this configuration, the actuator array effectively generates torque with respect to the pivot point. It can be effectively divided into two equal segments, with each segment generating equal but opposing torques that effectively bring the entire system into static equilibrium. Each segment (e.g. 602 in FIG. 6A) is further subdivided into three sections: the angled section (middle pair) 604 (FIG. 6B), the edge section (first and last pair) 606 (FIG. 6D), and the straight middle section (all other pairs) 608 (FIG. 6C). The sections of the second segment include the (n/2+1) to the $n^{th}$ actuator elements. Each section has its own unique mechanical behaviors. The total torque ($T_{Total}$) generated by the actuator array is the sum of each element's generated torque ($T_i$).

$$T_{Total} = \sum_{i=1}^{n/2} T_i \tag{1}$$

Figure 7:
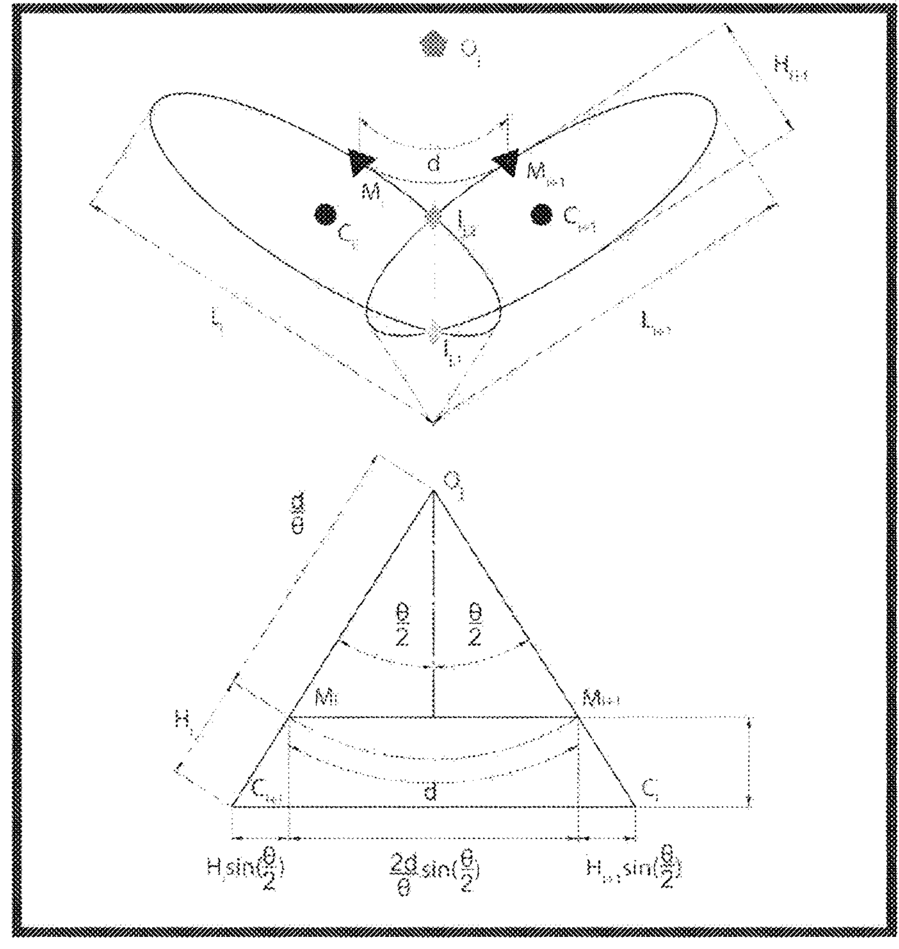
FIG. 7 shows a schematic diagram illustrating interference of adjacent actuator elements.

Force from element intersections ($\vec{F}_j$) is dependent of the nature of the contact area ($A_C$) between two colliding elements. Due to the elliptical shape of the elements, this model approximates the contact area as a rectangle as a result. The contact area can be determined by examining the cross-section as seen from the top-view (FIG. 7). The centers, $C_i=(C_{i,x},C_{i,y})$ and $C_{i+1}=(C_{i+1,x},C_{i+1,y})$ of the two ellipses are first established; in the proceeding calculations, both centers lie on the x-axis while the origin coincides with $C_{i+1}$. Points $M_i=(M_{i,x},M_{i,y})$ and $M_{i+1}=(M_{i+1,x}M_{i+1,y})$ are the points of attachment on the fabric base. Upon inflation, the actuator elements collide and rotationally displace by the bending angle ($\theta_j$). They then trace a circular path centered around point $O_j$; the arc length of this path is equal to element spacing (d). $C_{i,x}$ can then be calculated:

$$C_{ix} = H_i \sin\frac{\theta}{2} + \frac{2d}{\theta}\sin\frac{\theta}{2} + H_{i+1}\sin\frac{\theta}{2} \tag{2}$$

$$C_{ix} = \left(H_i + H_{i+1} + \frac{2d}{\theta}\right)\sin\frac{\theta}{2} \tag{3}$$

With the location of the centers known, the ellipses can now be mathematically defined with equations (4) and (5):

$$1 = \left(\frac{(x_i - C_{ix})\left(\cos\frac{\theta}{2}\right) + (y_i - C_{iy})\left(\sin\frac{\theta}{2}\right)}{\frac{H_i}{2}}\right)^2 + \left(\frac{(y_i - C_{iy})\left(\cos\frac{\theta}{2}\right) + (x_i - C_{iy})\left(\sin\frac{\theta}{2}\right)}{\frac{L_i}{2}}\right)^2 \tag{4}$$

-continued $$1 = \left(\frac{(x_{i+1} - C_{i+1x})\left(\cos\frac{\theta}{2}\right) + (y_{i+1} - C_{i+1y})\left(\sin\frac{\theta}{2}\right)}{\frac{H_{i+1}}{2}}\right)^2 + \left(\frac{(y_{i+1} - C_{i+1y})\left(\cos\frac{\theta}{2}\right) + (x_{i+1} - C_{i+1y})\left(\sin\frac{\theta}{2}\right)}{\frac{L_{i+1}}{2}}\right)^2 \tag{5}$$

The points of intersection, $I_{j,1}=(I_{j,1,x}, I_{j,1,y})$ and $I_{j,2}=(I_{j,2,x},I_{j,2,y})$, between the two ellipses are determined by simultaneously solving equations (3) and (4). The quadratic nature of the equations can produce up to four points in intersection. To prevent the model from underestimating the size of the contact area, the two points with the largest distance between them are chosen. The rectangular $A_C$ is then calculated using equation (6) below, where $W_i$ is the module's width. The line of action of the force vector ($\vec{F}_j$) is assumed to lie within the center of and is normal to $A_C$. $\vec{F}_j$ is calculated through equation (7), where P is the pressure inside the modules.

$$A_C = d(I_{j,1}, I_{j,2})(W_i) \tag{6}$$

$$\vec{F_J} = (PA_C)\cdot\frac{I_{j,1}xI_{j,2}}{\|I_{j,1}xI_{j,2}\|} \text{ where } \vec{F_J} = (F_{j,x}, F_{j,y}) \tag{7}$$

The angled section $$\left(\left(\frac{n}{2}+1\right)^{th} \text{ module and } \left(\frac{n}{2}-1\right)^{th} \text{ module}\right)$$

transmits a vertical force and a horizontal force to the arm or body which is subsequently converted to torque. The vertical force is effectively transmitted as a linear distributed load, while the horizontal force can be effectively considered as a point load. This horizontal force is also opposed by the contact in the j/2+1 pair, and it is noted that the j/2+1 pair is oriented 0° from each other (i.e. θ=0°). The torque generated by the angled section $$\left(T_{\frac{n}{2}+1}\right)$$

is given by equation (8).

$$T_{\frac{n}{2}+1} = H_{\frac{n}{2}+1}x\left(\vec{F}_{\frac{n}{4}} - \vec{F}_{\frac{n}{4}+1}\right) + \frac{d\left(M_{\frac{n}{2}+1} - I_{\frac{n}{4}j,2})\right)}{3}x(\vec{F}_{\frac{n}{4}}) \tag{8}$$

At θ>−90°, vertical component of $\vec{F}_j$ ($\vec{F}_{jy}$) no longer contributes to torque generation due to the fact that vertical forces is now directed away from the arm, and is transformed into tension on the fabric base, as opposed to generating a counter-acting force on the arm. This results in minor compression of the actuator array but does not significantly affects performance. At θ>−120°, $$T_{\frac{n}{2}+1}$$

is described by equation (9).

$$T_{\frac{n}{2}+1} = H_{\frac{n}{2}+1}x\left(\vec{F}_{\frac{n}{4}} - \vec{F}_{\frac{n}{4}+1}\right) \quad (9)$$

It can be seen in FIG. 6C that each module along the middle sections generates equal and opposing forces from their intersection with their adjacent modules. This results in zero torque generation for modules in the middle section.

$$T_i = H_i x\left(\vec{F}_j - \vec{F}_{j+1}\right) = 0 \text{ where } n \neq 1, n, \frac{n}{2}+1, \frac{n}{2}-1 \text{ and } j \neq \frac{n}{2}, \frac{n}{4}, \frac{n}{4}-1 \quad (10)$$

It is assumed that the modules adjacent to the edge module (i.e. $2^{nd}$ and $(n-1)^{th}$ modules) are oriented parallel to the edge module (i.e. θ=0°). Therefore, only a single force generates torque for the module. The torque generated by the edge section ($T_n$) is given by equation (11):

$$T_n = H_n x(\vec{F}_{\frac{n}{2}}) \quad (11)$$

Finally, equation (1) can be simplified into equation (12):

$$T_{Total} = \begin{cases} H_{\frac{n}{2}+1}x\left(\vec{F}_{\frac{n}{4}} - \vec{F}_{\frac{n}{4}+1}\right) + \frac{d\left(M_{\frac{n}{2}+1} - I_{\frac{n}{4},2}\right)}{3}x(\vec{F}_{\frac{n}{4}}) + H_n x(\vec{F}_{\frac{n}{2}}), & \theta_{\frac{n}{4}} \leq -90 \\ H_{\frac{n}{2}+1}x\left(\vec{F}_{\frac{n}{4}} - \vec{F}_{\frac{n}{4}+1}\right) + H_n x(\vec{F}_{\frac{n}{2}}), & \theta_{\frac{n}{4}} > -90 \end{cases} \quad (12)$$

It has been noted that the mechanical performance of the actuator array in example embodiments depends on the combination of factors including geometries of actuator elements and the individual pressures applied to each element. Nevertheless, a representative design was constructed in order to give a general understanding on the capabilities of the actuator array design, as well as its performance trends. Table 1 lists the geometric features of an example design. The design was then evaluated using various preliminary tests, where all the bladders were inflated to a common pressure.

TABLE 1

| Module Spacing (d) | Module A Size (L × W) | Module B Size (L × W) | Module Pattern |
|---|---|---|---|
| 15 mm | 65 mm × 55 mm | 90 mm × 55 mm | BABABABA |

The first test comprising a one-dimensional free bending was designed to measure the actuator array's performance to bend and curve in an unloaded state. Primary kinematic evaluation was done by measuring the total bending angle of the samples in response to a pressure input. The samples were clamped and mounted in a cantilever fashion. Pressure inputs were given in 5 kPa increments and camera footage was recorded for 180-second durations per input. The maximum pressure supplied was 80 kPa.

In contrast to the other actuators in its class, the present actuator array was able to achieve maximum bending (i.e. 360° bend) with just 5 kPa of supplied pressure. While the application of higher pressures resulted in faster actuation, it was nonetheless still able to achieve its full range of motion with minimal inputs. This implies that (a) the actuator array has little or no internal mechanical resistance, and (b) it can follow any structure to which it is attached to regardless of the pressure supplied.

Figures 8A, 8B, 8C:
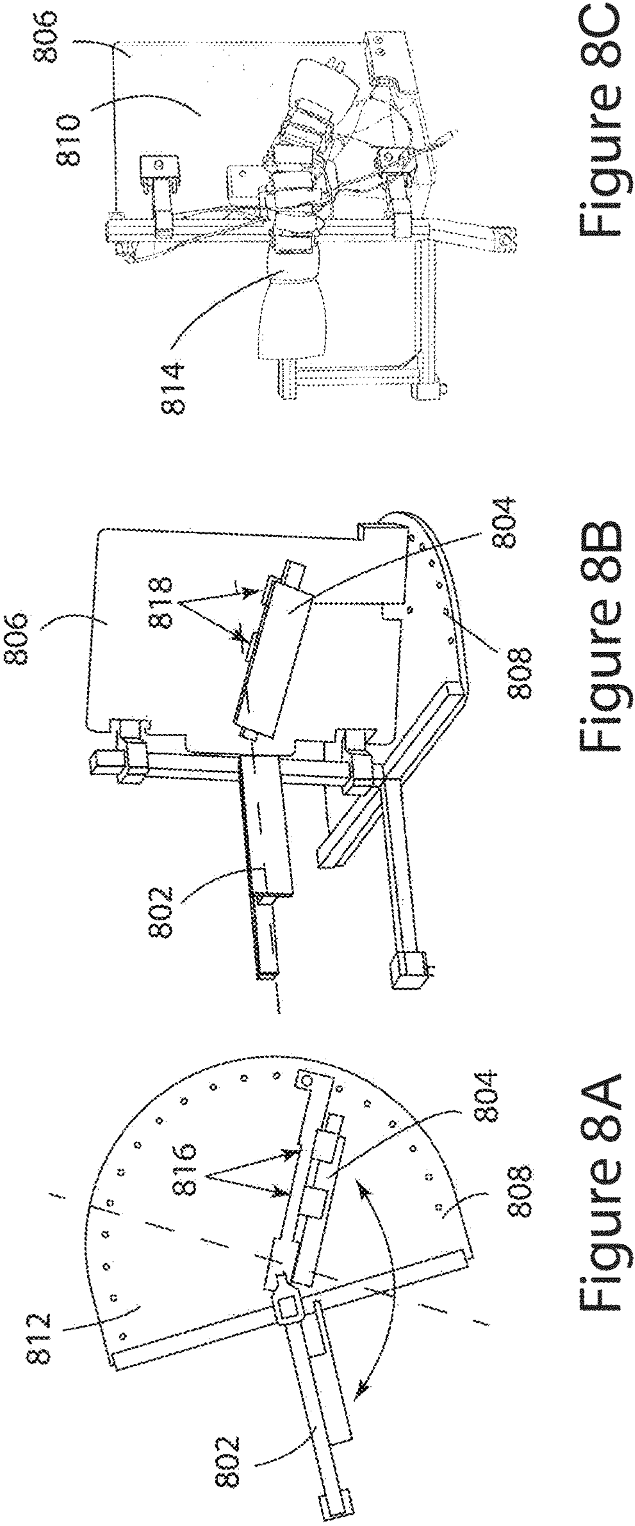
FIGS. 8A-8C show a test set-up to evaluate performance of the actuator array.

The second test comprising a blocked torque was designed to measure the torque output of the actuator array when applied with an external load. A two-dimensional (2-D) torque measuring mechanism, as shown in FIGS. 8A-8C, was constructed. FIGS. 8A-8B show a computer model of the mechanism, while FIG. 8C shows an actual set-up. A sample was attached to 2 arms. One arm 802 was fixed, while another arm, the free arm 804, was attached to a vertical swing plate 806. Indexing holes 808, 810 were placed on a base plate 812 and on the swing plate 806 in order to determine the free arm 804's position. The free arm 804 rotated on the swing plate 806's surface while the swing plate 806 rotated along the base plate 812, allowing for 3-D bending measurement. The axis of rotation of the plate 806 was parallel to that of the sample's (A-A' axis), allowing the device to capture the torque output of the actuator array at various rotational positions. In addition to this capability, the free arm 804 was also capable of performing rotations along the B-B' axis, in order to capture the actuator array's capability to allow rotations outside its active axis of rotation. In the experimental set-up shown in FIG. 8C, a neoprene sheet 814 was attached to the arm 804 while industrial strength hooks attach the base of the actuator array onto the neoprene sheet 814.

Four load cells were attached to the free arm: two cells 816 measured forces generated by the actuator along the A-A' axis and another two load cells 818 for the B-B' axis. Load cells 816, 818 were held in position by their holders. Together, the load cells 816, 818 captured the forces applied to the free arm 804 by the actuator array. These forces were subsequently translated to torque by multiplying their distances from the A-A' axis and B-B' axis respectively. While the actuator array was incapable of generating torques on the B-B' axis, the load cells were provided in order to ascertain if inflation of the actuator elements would create a restoring torque that would tend to rotate the actuator array back to a natural, planar, circular shape.

Figure 9:
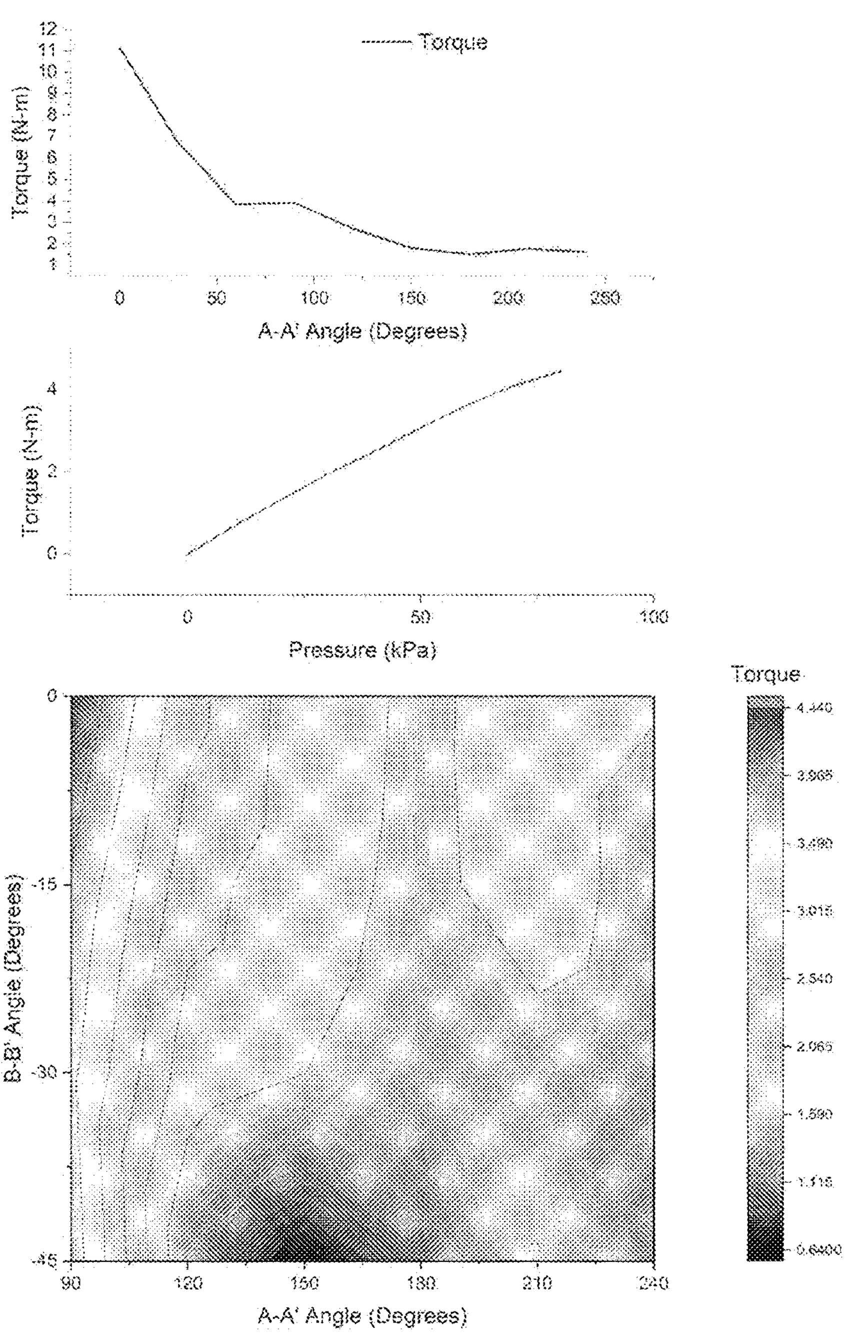
FIG. 9 shows results from one set of tests using the set-up of FIGS. 8A-8C.

Results of the test are shown in FIG. 9. The actuator array according to the present disclosure is able to provide a maximum of 11.15 N-m of torque at an angular position of 0° when pressurized to 80 kPa. This value goes down to 1.62 N-m as the bending angle decreases to 180°. The torque value remains constant between 180° and 240°. As with all pneumatic actuators, the present actuator array has a linear relationship between the pressure applied and the torque output. There is a however a decline in A-A' axis torque output as the actuator array is bent along the B-B' axis while the there are no measurable torques along the B-B' axis along all B-B' axis angles. This suggests that there may be no torque interaction when two actuator arrays are paired in a perpendicular orientation. Such a feature can entail simpler control requirements as compared to the scenario where an interaction exists.

In another series of tests, three actuator variants were constructed, with each variant having a total of eight modules installed. The variants differ in the size and pattern of the modules installed. Their geometric parameters are listed in Table 2. Module widths were based on the lower 5th percentile of female upper arm diameters for variant B, and the lower 5th percentile of male upper arm diameters for variant C. Module spacing (d) was set at 25 mm in order to minimize the discontinuity in the curvature profile of the actuator. Different module patterns (i.e. AAAA, ABAB, ACAC) were chosen for this series of tests. An alternate pattern such as ABAB or ACAC involved the installation of alternating module sizes. The module lengths were then set to 65 mm and 90 mm to ensure sufficient spatial interference between adjacent modules.

TABLE 2

| Module Variants | Module Length (L) | Module Width (W) |
| --- | --- | --- |
| A | 65 mm | 55 mm |
| B | 90 mm | 55 mm |
| C | 90 mm | 65 mm |

| Actuator Variant | Module Patterning |
| --- | --- |
| D1 | AAAAAAAA |
| D2 | ABABABAB |
| D3 | ACACACAC |

The tests were then performed using the same set-up described above with reference to FIGS. 8A-8C. All experiments were repeated three times, and the samples were dismounted and remounted before each repetition in order to minimize the effects of any actuator movement that may have occurred during a measurement. The results of the experiments are shown in FIGS. 10A-10F.

The results show that each actuator array, when unloaded, was able to achieve full bending (>360°) when excited with a pressure of 10 kPa. An increase in pressure did not have any effect on its pose. Static equilibrium was only achieved when each module was tangential to each adjacent module (i.e. are in point-contact).

Figure 10:
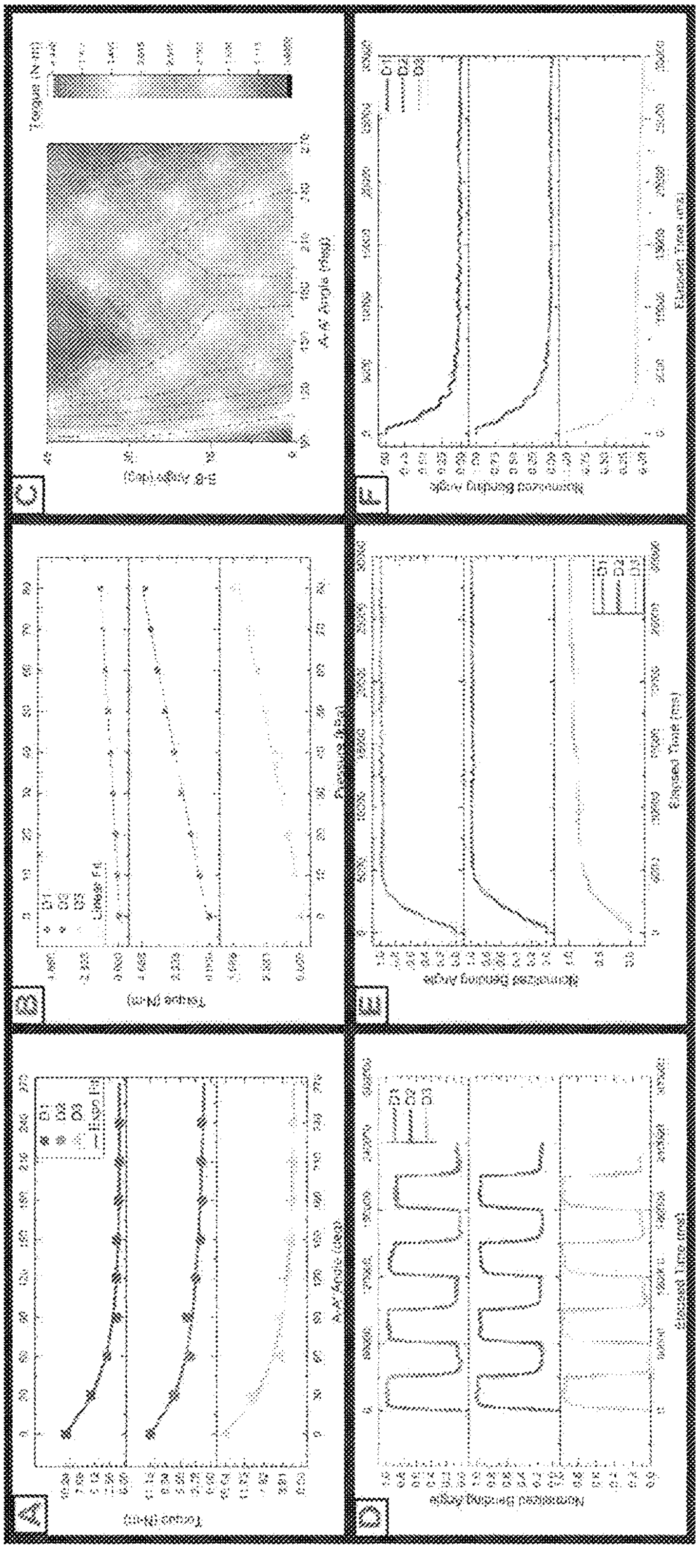
FIGS. 10A-10F show results from another set of test using the set-up of FIGS. 8A-8C.

The torque output of the actuator array at any input pressure was driven by the contact area of the adjacent modules. A consequence of this relationship is that the maximum torque output at any position may be dependent on the available contact area. FIG. 10A shows the results of each variant's torque output as a function of A-A' angle at 30° increments. The measurements were acquired by setting the B-B' angle to 0° and pressurizing the actuator to 80 kPa. The actuator array exerted maximum torque at 0° and the slope of the torque curve gradually decreased as angle A-A' increased. Most notably, the rate of decrease tapered off beginning at an A-A' angle of about 180°. Effectively, from 180° to 270°, the actuator array's torque output became constant. This behavior may be due to the fact that from 0° to 180°, the torque generated is a combination of interference forces generated along a bigger surface area since, at this position, the actuator arrays were essentially folded onto themselves. The unfolding nature of the modules can ensure that the contact area is constant when the actuator array is positioned between 180° to 270°. The torque output at 80 kPa pressure ($T_P$) can be reliably predicted by the A-A' angle (A) through equation (13) with no apparent overfitting. Curve fitting was performed using MATLAB's Curve Fitting Toolbox. Equation (13) is a numerical, exponential curve fit with parameters a, b, c, and d. The curves have a minimum coefficient of determination ($R^2$) value of 0.977.

$$T_p = a^{b*A} + c^{a*A} \tag{13}$$

FIG. 10B shows the output of the actuator array as a function of the input pressure. These measurements were taken at an A-A' angle of 90° and a B-B' angle of 0°. The pressure inside the actuator array was varied from 0-80 kPa. The output has near-perfect linear correlation between torque and pressure. The data sets of all 3 variants were modeled using equation (14), with a minimum $R^2$ value of 0.991. Similarly, equation (14) can be used to predict torque at any given A-A' angle ($T_A$) while f and g are the parameters for equation (14), and g is typically equivalent to zero since the torque when not pressurized is also zero. This behavior is consistent with the behavior of pneumatic bending actuators.

$$T_A = f * P + g \tag{14}$$

An increased reduction in available contact area occurred when the A-A' angle and B-B' angle changed simultaneously. The effects of this behavior on variant D2 are shown in FIG. 10C. In this measurement, the A-A' angle was set to 90° and the B-B' angle was varied from 45° to 0° at 15° increments. This range of motion corresponds to that required of the majority of activities of daily living (ADLs). The actuator array was then pressurized to 80 kPa. An overall decrease in the torque output along the A-A' axis was found as the B-B' angle was increased from 0° to 45°. However, the platform was not able to detect any significant torque output (>0.5 N-m) along the B-B' axis. This can be attributed to the ability of each individual module to translate in 3-D as well as the aspect ratio of the modules; they show minimal surface area along the B-B' axis. Effectively, the modules reposition themselves such that there is minimal resistance during operation, resulting in small B-B' torques.

FIG. 10D shows the bending angle response of a weighted actuator array. The curves presented have been averaged across the trials. At 0 s, the square wave was fed into the actuator. The overall response of each of the actuator array variants resembled a similar square wave, with an expected time delay. FIG. 10E and FIG. 10F show the averaged inflation and deflation responses, respectively. Variants D1, D2, and D3 have inflation rise times of 4.72 s, 2.12 s and 3.62 s, respectively, and deflation rise times of 3.40 s, 4.42 s and 1.82 s, respectively. Moreover, no discernible correlation was found between module sizing and response times while the step response resembles that of a $1^{st}$ order system with no overshoots.

Figure 11:
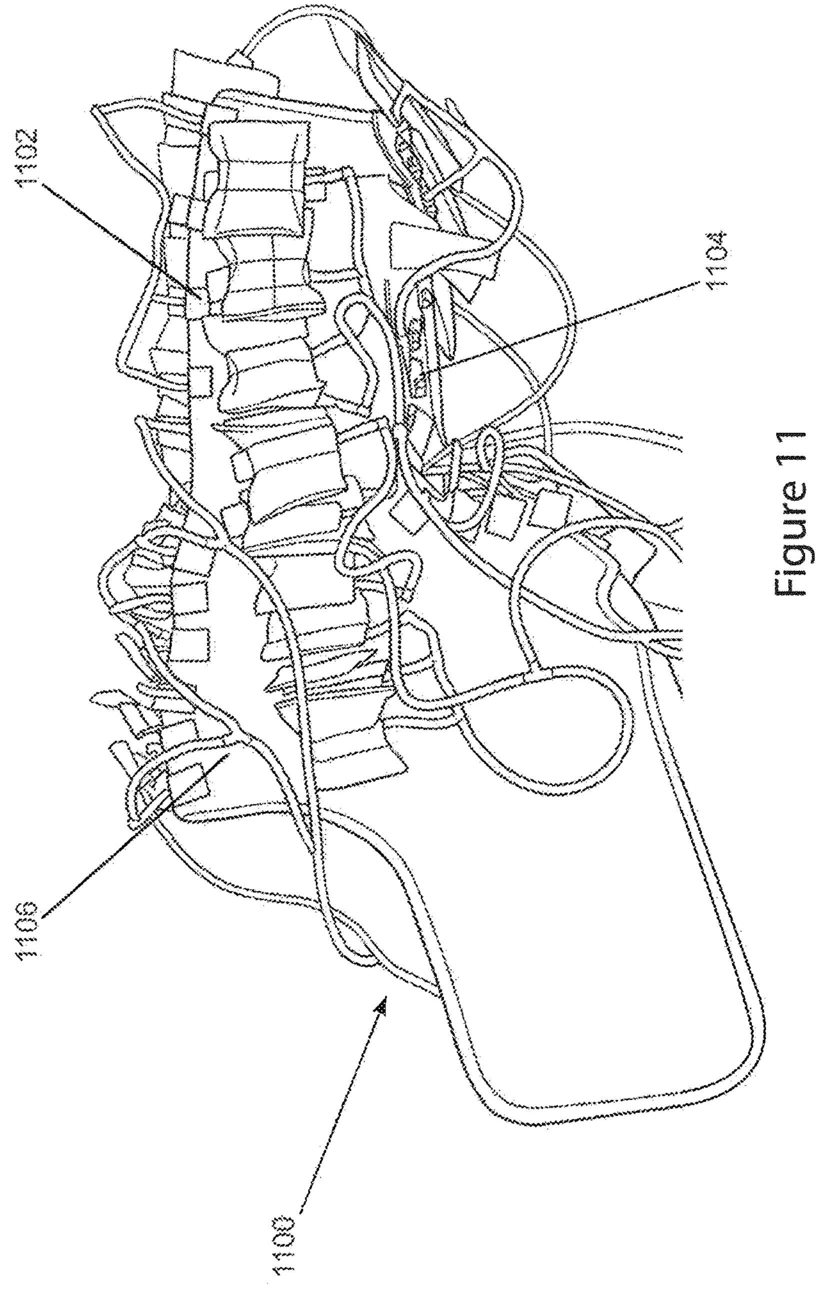
FIG. 11 shows a shoulder exoskeleton according to an example embodiment.

While the actuator array as described can be applied to produce a variety of functions, one practical application can be illustrated by a 2-degree of freedom, soft robotic exoskeleton. The exoskeleton is designed to reduce a person's muscular effort in performing shoulder movements by providing assistive torque to the user during upper arm motion. FIG. 11 shows an exoskeleton 1100 according to an example embodiment. The exoskeleton 1100 includes 2 pairs of actuator arrays, with each pair (1102 and 1104) arranged in an antagonistic fashion. In use, the actuator arrays are placed along the top of the arm and shoulder, along the armpit, and along the front and back of the arm. The two pairs are attached to a customized, tight-fit, neoprene sleeve 1106. Attachment is done using hook and loop fasteners (e.g. Velcro), with hooks attached to the back side of each actuator array while the entire sleeve 1106 acts as a hook. The first pair activates shoulder abduction and adduction, while the second pair provides support for shoulder horizontal flexion and extension. Due to the soft nature and mechanical characteristics of the actuator arrays and the manner by which they can be attached to the sleeve 1106, the exoskeleton 1100 is capable of providing full range of motion to the arm. Moreover, the exoskeleton 1100 can perform 90° movements, starting from the natural position, in as fast as ~1.7 s when powered by an industrial compressor in a lab setting. It will be appreciated that, just as in any pneumatic system, the speed of actuation may be highly dependent on the specific pneumatic components utilized. It will also be appreciated that while two pairs of actuator arrays are used in the exoskeleton 1100, other embodiments may use as few as a single actuator array, or more actuator arrays.

Controlled, simultaneous activation of both pairs can generate a combined torque that allows the user to perform shoulder flexion and extension by leveraging the actuator's capability to bend out of plane. In essence, the exoskeleton 1100 is capable of reaching the arm's entire workspace in one motion.

Figure 12:
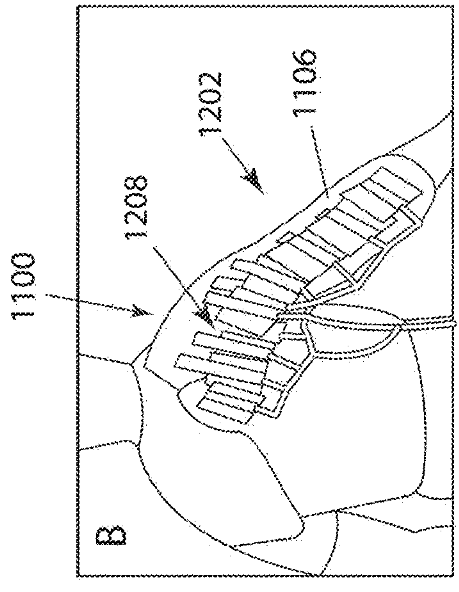
FIGS. 12A-12B show front and back views of the shoulder exoskeleton of FIG. 11 when mounted to a user.

FIGS. 12A-12B show front and back views, respectively, of the exoskeleton 1100 when mounted to a shoulder of a user. As described, the chassis of the exoskeleton 1100 is a neoprene sleeve 1106 that acts as a hoop to which the spines (i.e. bases) of the actuator arrays can be attached. In practical use, a loop strap may be placed along the torso of the user to ensure that the sleeve 1106 remains secure during operation. Additional adjustable straps may also be placed on the lateral side of torso on the opposite end. The four actuator arrays, configured as two antagonistic pairs, are placed on the shoulder, with each actuator array positioned 90° from each other. Each pair is responsible for each degree of freedom one pair performing humerus elevation and depression, while another performing rotation of the humerus along the plane of elevation. The depression actuator array 1202 starts from the base of the neck, tracing the superior side of the humerus. The elevation actuator array 1204 is placed on the inferior side, starting from the lateral area of the ribcage and extending through the armpit and the arm. The steering actuator arrays 1206, 1208 are placed on the anterior and posterior arm starting from the sternum and the spine, respectively. Additional modules, positioned as to have minimum available contact area, are added along the upper arm.

Using hook-and-loop fasteners, the actuator arrays can be specifically placed on the body of each user. The use of neoprene as the primary material for the sleeve 1106 provides the exoskeleton 1100 with an elastic chassis/base that tightly follows the contours of the body. This allows the sleeve 1106 and the actuator arrays to remain in the correct position. The positioning of the actuator arrays takes advantage of their torque-angle curve. Using this configuration, the majority of the load is to be handled by the elevation actuator array 1204. This actuator array primarily operates in the 0°-90° region, which is the region of maximum torque. The other actuators reside in the 180°-270° region, where the torque-angle relationship is effectively constant. Moreover, the actuator arrays are mounted in a parallel configuration. This allows the exoskeleton 1100 to distribute its force application throughout the entire surface area of the arm. The use of antagonistic actuator arrays also negates the effect of drift during deflation since the agonist is primarily responsible for deflating the actuator array. An additional feature of the modular spine is that the torque output of both pairs can be combined such that they can trace trajectories outside a single actuator array's axis of rotation. This can be achieved through the simultaneous activation of both pairs.

Each actuator array is configured to push against the arm and the torso, generating a bending moment that moves the arm. Furthermore, each actuator array is configured in a manner such that optimal bending curvature is achieved near the joints while the areas attached to the limbs become straight when inflated. This can be achieved by configuring joint area actuator elements to have bending radii more akin to that of the human shoulder, while straightening sections can be generated by pairing actuator elements with minimal interference. Together, these actuator arrays are capable of providing, abduction, horizontal flexion and flexion.

The operation of the actuator arrays allows the humerus to trace a natural trajectory. From the neutral position, the humerus can perform shoulder abduction and adduction by activating the elevation or depression actuator array 1202. The shoulder can also be rotated along the plane of elevation by sequentially activating the elevation actuator array 1204 and steering actuator arrays 1206, 1208. Simultaneous activation of the elevation actuator array 1204 and steering actuator arrays 1206, 1208 also provides the ability to perform shoulder flexion or extension. In addition to performing the basic anatomical movements, the controlled activation of both steering actuator arrays 1206, 1208 and the elevation actuator array 1204 allows the performance of reaching actions. Reaching movements allow the exoskeleton to assist the users in a wide variety of ADLs in a seamless manner. Moreover, the exoskeleton 1100 is able to provide support throughout the entire range of motion of the shoulder and this is mainly attributed to the minimal mechanical resistance of the actuator elements coupled with the parallel actuation configuration of the exoskeleton 1100.

The primary purpose of the exoskeleton 1100 is to help users in performing arm movements by reducing the load on the muscles. This manifests in a reduction of muscular effort during motion which is correlated to the amplitude of the nerve signals to the shoulder. A reduction in muscular effort would correspond to weaker muscle activation signals. Experimentally, this can be determined through surface electromyography (sEMG). sEMG involves the external application of sensors along the arm the human body which aims to record the muscle signals underneath the sensors. A pilot study was performed wherein the muscle signals of a single subject was recorded through sEMG.

The subject was attached with sEMG sensors on the anterior, posterior and lateral deltoid, the clavicularis and abdominalis sections of the pectoralis major. The subject was then instructed to perform: (1) 90° shoulder abduction and adduction, (2) 90° shoulder horizontal flexion and extension, and (3) 90° shoulder flexion/extension. Each movement was performed 3 times under 3 conditions: (a) no exoskeleton, (b) active, exoskeleton unassisted motion, and (c) exoskeleton assisted motion. In other words, the subject performed 3 repetitions per movement, per condition. Condition (a) serves a baseline in order to ascertain the default amount of muscle activation. Condition (b) serves to determine if the exoskeleton adds resistance to the shoulder, while condition (c) measure muscle activation while the exoskeleton provides powered assistance.

Figure 13A:
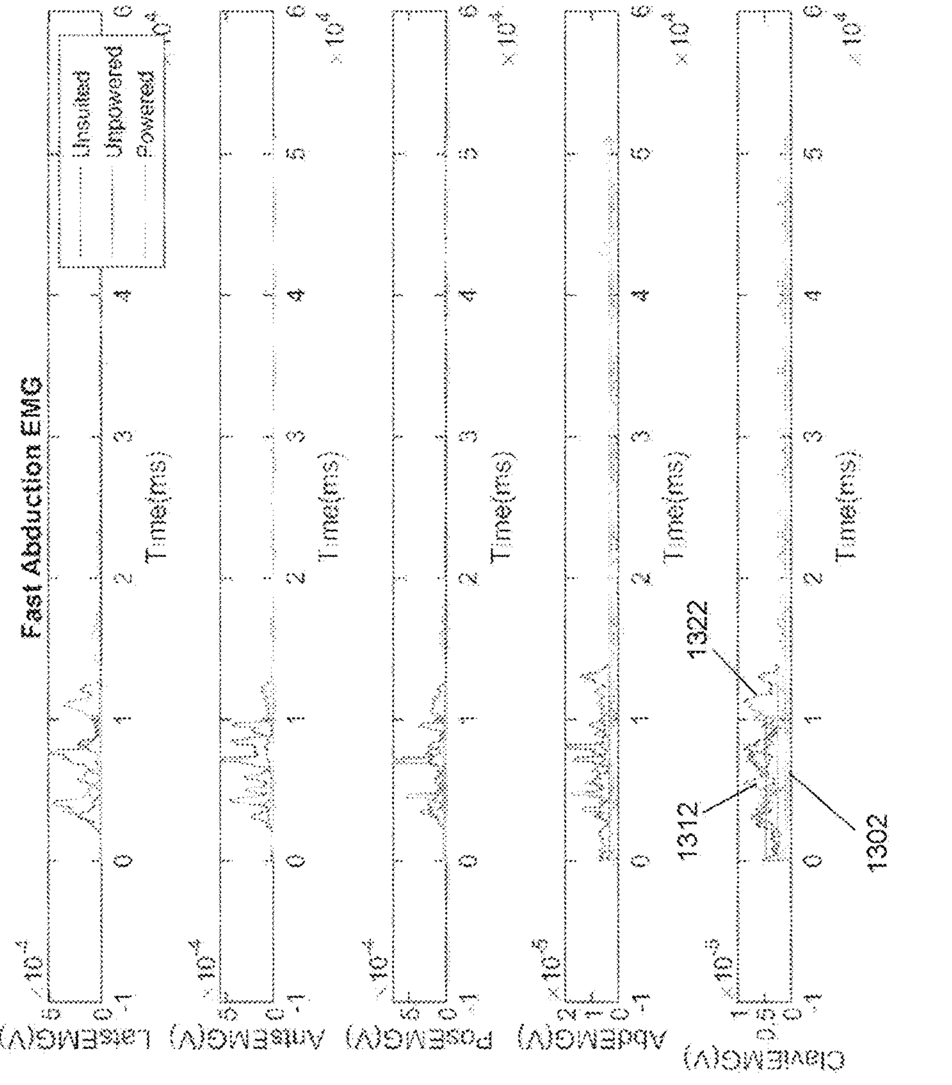
FIGS. 13A-13C show sEMG graphs comparing muscle signals under different conditions.
Figure 13B:
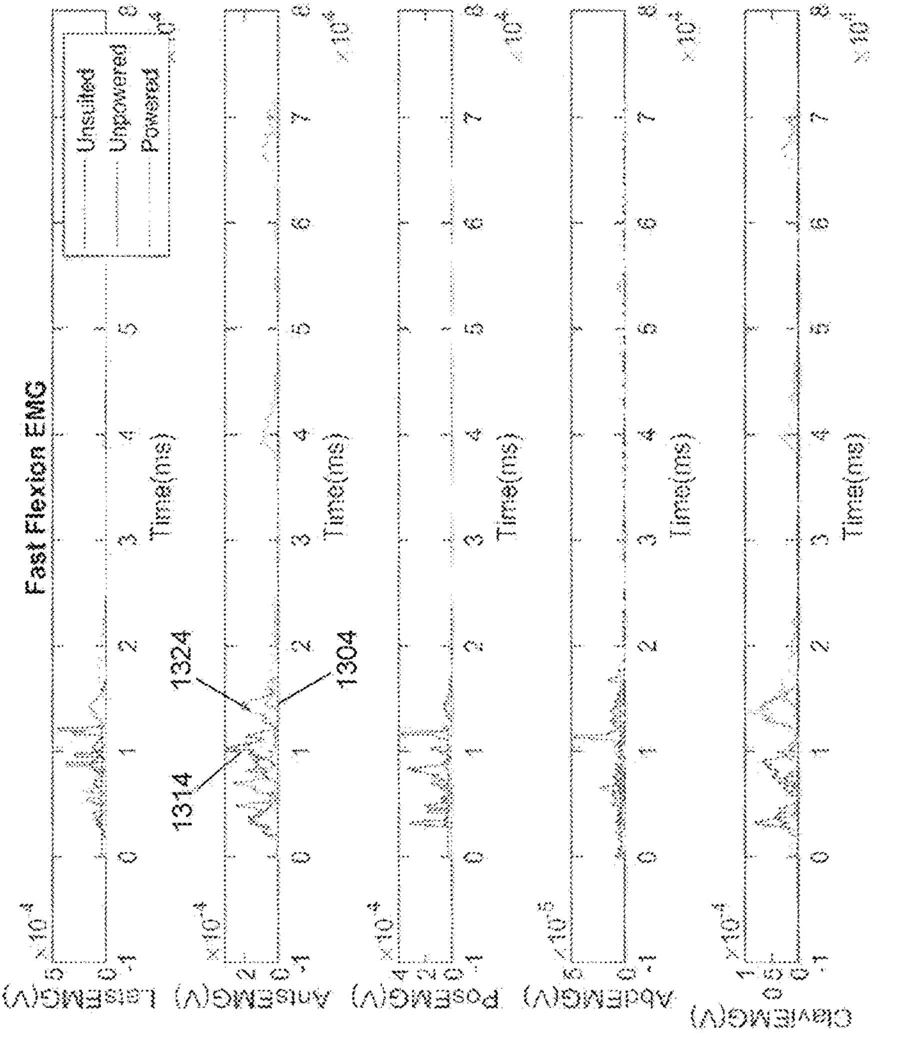
Figure 13C:
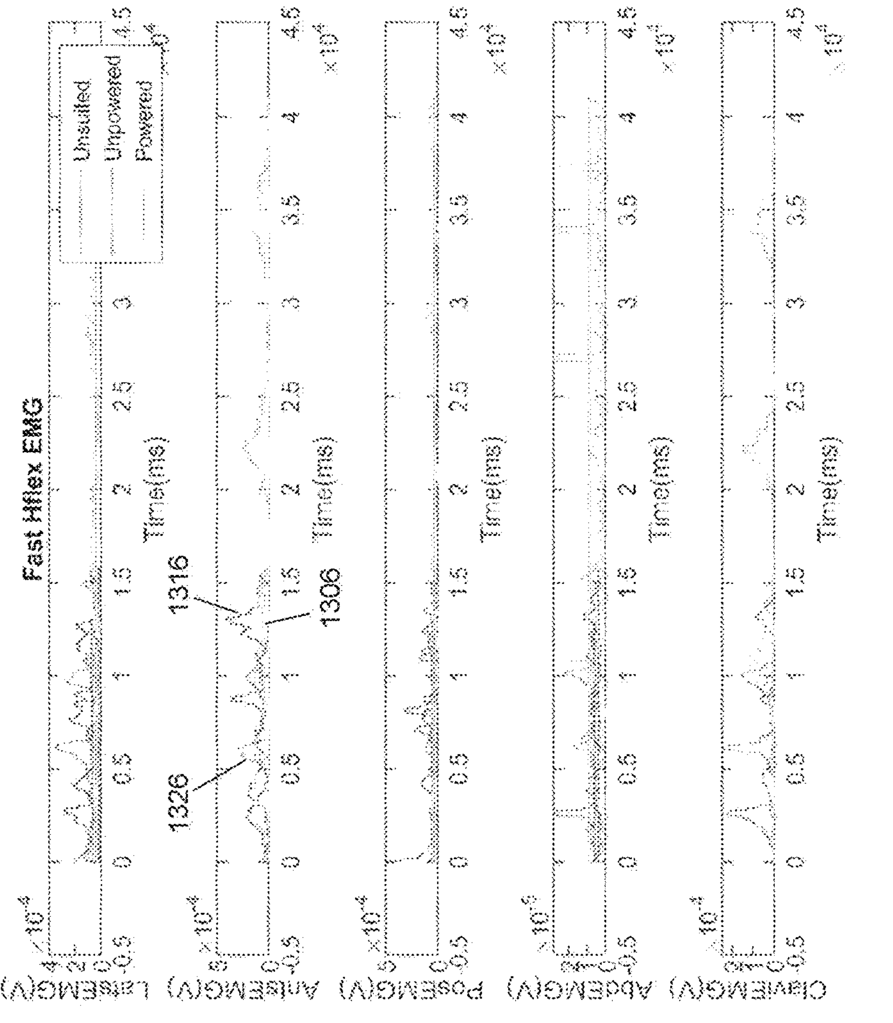

FIGS. 13A-13C shows the results of the experiment. It can be seen that powered assistance (e.g. lines 1302, 1304, 1306) shows lower overall signals as compared to the baseline (e.g. lines 1312, 1314, 1316) and the resistance condition (b) (e.g. lines 1322, 1324, 1326). In other words, the results clearly show that the assistance provided by the exoskeleton reduces the muscular effort during shoulder movements.

Further analysis and comparison of powered and unpowered movements have conclusively demonstrated lessened muscle activation when assisted by the powered exoskeleton, which consequently indicates that the exoskeleton effectively provides torque to the human arm. Likewise, the comparison of powered movements and free movements shows the exoskeleton's capability to reduce muscle activation. It can reduce deltoid activation by up to 65% while performing abduction and adduction, and is also capable of providing multi-DOF support, which allows subjects to perform forward flexion and extension. While the exoskeleton also reduced muscle activation by about 45% during forward flexion movements, the amount of assistance was reduced to about 25% when performing the equivalent unloading motion (i.e. forward extension). This is due to the reduced overall load on the muscles when performing extension movements as compared to performing flexion movements. Furthermore, the exoskeleton was able to steer the arm's angle of plane of elevation, which reduced muscle activation by up to 33% when performing horizontal flexion and extension. This amount of mobility is attributed to the unique actuator design. While each actuator element can only actively generate torque in one axis, the separated module design allows the actuator array to perform 3-D movements when acted upon by an external force (e.g. a secondary actuator array mounted perpendicularly).

The actuator array according to example embodiments can also be used to construct lower body exoskeleton, e.g. a lower back exoskeleton, or a hip exoskeleton. The hip shares kinematic requirements with the shoulder due to its ball-joint structure. While the femoral head of the hip does not translate during movement, it still requires an actuator array capable of performing 3-D bending in order to retain its natural range of motion. Further, the actuator array may also be utilized in industrial settings. For example, it can be configured into rotary actuators, robotic grippers, full robotic arms.

Figure 14:
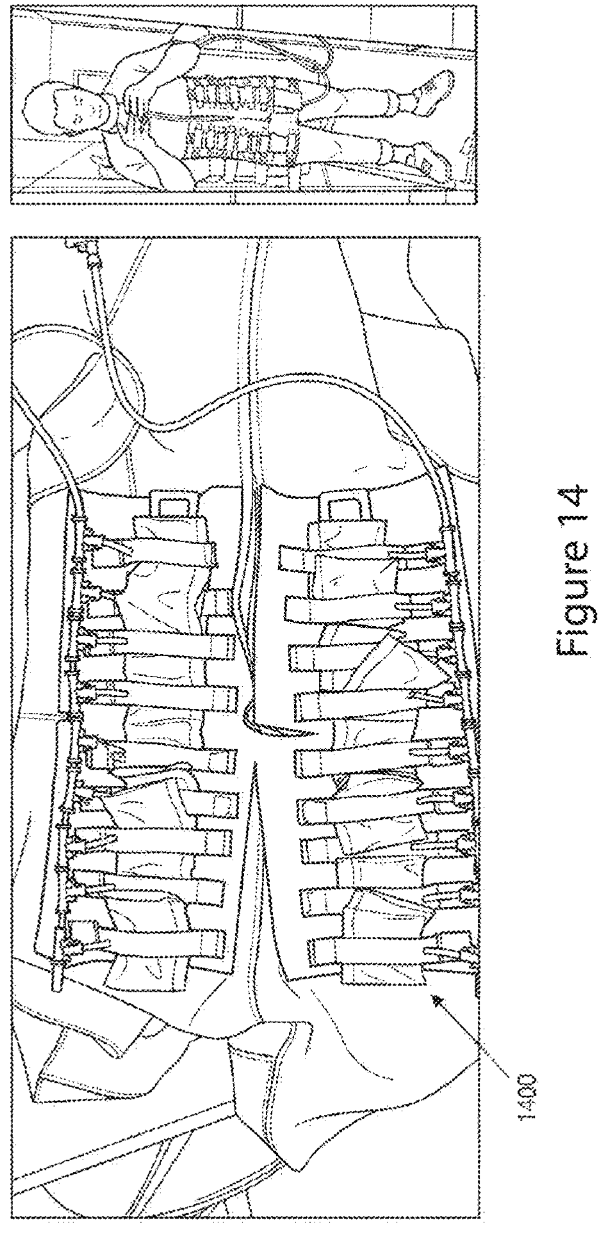
FIG. 14 shows a lower body exoskeleton according to an example embodiment.

FIG. 14 shows an example where the actuator arrays are assembled to create an exoskeleton 1400 to support the lower body. The goal of the exoskeleton 1400 is to reduce the load on the abdominal and posterior torso muscles when performing bending movements and activities such as lifting, squatting, sit-to-stand, as well as static motions that require stability in the lower back such as carrying and walking. In order to realize these functions, actuator arrays are placed on the anterior and posterior sections of the lower torso. In total, four sets of actuators (i.e. 4 arrays) are placed on the torso: two on the anterior side and two on the posterior side. The anterior actuator arrays resist forward bending motions, while the posterior actuator arrays provide additional torque to perform bending motions. This can be achieved by inflating anterior actuator arrays when the users desire to resist forward bending, while the posterior actuator arrays are inflated when the user wishes to perform forward bending. Alternatively, controlled inflation of all actuator sets may be performed if the user wishes to maintain a specific position.

The anterior actuator arrays typically begin at the midpoint on the anterior plane of the thigh, traversing a line parallel to the axis of the thigh and terminating just below the $10^{th}$ rib. Padding may be placed underneath the torso section of the actuator array to minimize discomfort to the user. Similarly, the posterior actuator array begins on the midpoint of the thigh and terminates somewhere on the lumbar spine.

The actuator array according to example embodiments may also be applied to simpler joints such as the elbow, knee wrist and fingers. Similarly, these exoskeletons can be easily converted into full-blown prosthetics due to their ability to reconfigure. For example, instead of attaching the actuators to a neoprene sleeve, a prosthetic version may include actuator arrays attached to each other, with each actuator array oriented 90 degrees from each other.

Figure 15:
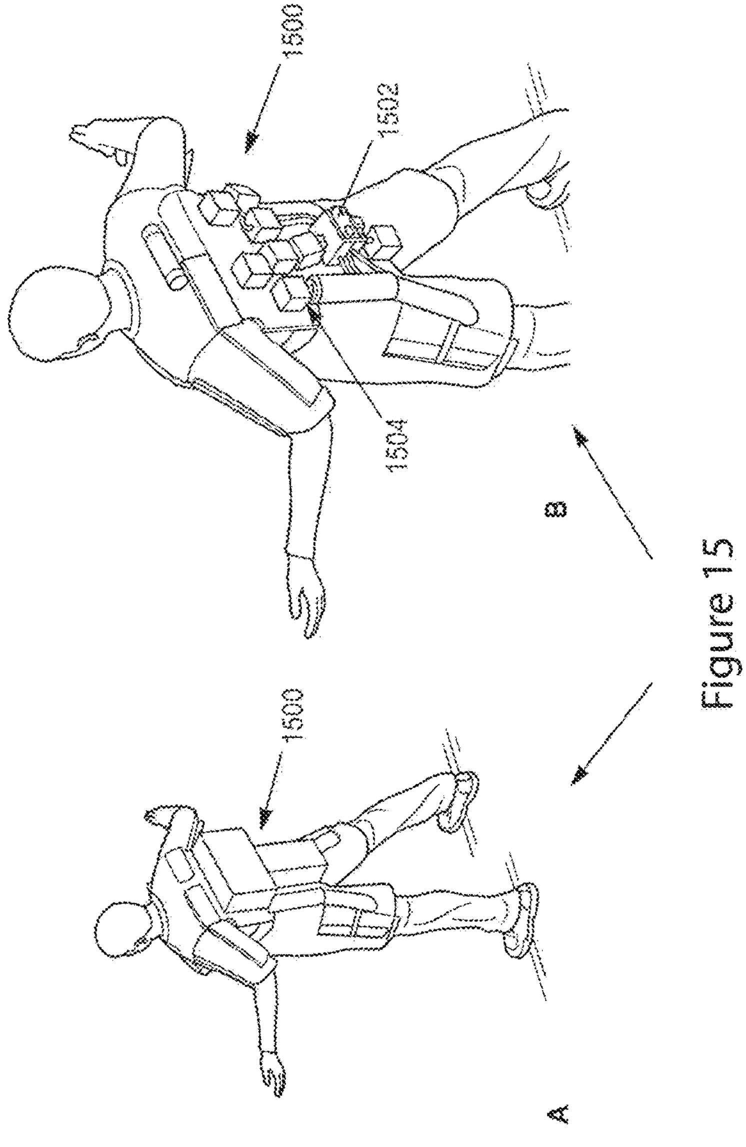
FIGS. 15A-15B show a full body exoskeleton according to an example embodiment.

Further, the exoskeletons as described above can be combined to create a full body exoskeleton. FIGS. 15A-15B shows a full body exoskeleton 1500 according to an example embodiment. The full body exoskeleton 1500 can provide support to the shoulders, lower back and upper-back. Upper back support may be performed by a passive semi-rigid plastic component embedded on the upper posterior section of the exoskeleton's base. As shown in FIGS. 15A-15B, the full-body exoskeleton 1500 may exist as a fully-portable version (i.e. a standalone unit) complete with onboard power supply 1502 and pneumatic components 1504. Alternatively, the exoskeleton may exist as a tethered version wherein the supply of power and compressed air is provided by off-board (i.e. external) systems.

The actuator array and/or exoskeleton of the present disclosure can also be embodied as a garment article. The garment article include at least one actuator array as described above, at least one sensor, and a processor communicatively coupled to the at least one actuator array and the at least one sensor. The processor is configured to control the bending motion of the at least one actuator array based on an input from the at least one sensor. One example implementation is a fabric-based garment for the upper body that provides support for muscular activity when performing labor with a feedback-based control system that comprises the processor in the form of embedded microprocessors and the at least one sensor in the form of position sensors, and a battery-based power management system. The control system controls a systematic array of air filled actuation systems that is flexible and lines the garment where it is designed to meet specific needs of the person wearing the garment.

Using a suitably configured exoskeleton or garment article having at least one actuator array as described, a variety of motions can be generated. For example, an exoskeleton or garment article can be programmed to assist a factory worker with a repetitive set of motions to be performed at different postures on an assembly line. In a vehicle assembly line, such an exoskeleton or garment article can be implemented as a pair of fabric-based shoulder sleeve that can assist the worker by providing muscular support during tasks such as vehicle underbody construction, attachment of upholstery, assembly of engines, and any other movement that requires high muscle activity. As a result, the worker can perform the tasks with consistency and reduced muscular effort and less fatigue.

In another example, it is noted that a significant number of nurses or caregivers regularly interact with patients who are no longer able to care for themselves. These nurses and caregivers have to lift and carry multiple patients throughout the day, every day, for essential tasks, such as sitting up to eat, changing clothes and bedsheets, moving from bed to wheelchair and back, and bathing, that require high muscle activity. To help nurses and caregivers perform their tasks, the exoskeleton or garment article as described can be worn to help alleviate the difficulty experienced by them by augmenting their muscle functions. For example, the exoskeleton or garment article can be implemented as a set of fabric-based overalls. By synchronizing the inflation of the actuator elements and limb movement, the exoskeleton or garment article is able to reduce the workload on the muscles. As a result, this can similarly reduce the load on the musculoskeletal system and the risk of injuries, and delay fatigue.

It will be appreciated that the above example applications are neither limiting nor exhaustive. The actuator array, exoskeleton and garment article as described can be appropriately configured for use in other applications to reduce human labor and muscular effort.

Figure 16:
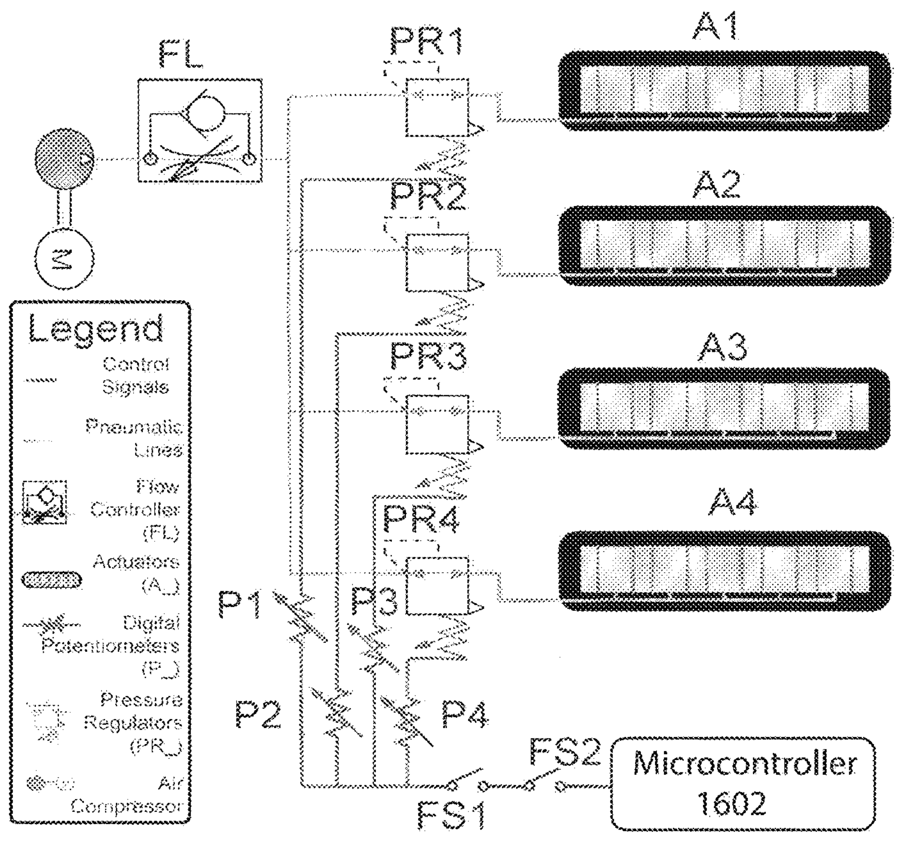
FIG. 16 shows a schematic circuit diagram for controlling an exoskeleton having four actuator arrays according to an example embodiment.

Control of the exoskeletons as described above can be achieved by regulating the applied pressure. Along with the angular position of the actuator array, the internal pneumatic pressure was responsible for the magnitude of its torque output. FIG. 16 shows a schematic diagram of a control circuit according to an example embodiment. A microcontroller 1602 (Teensy 3.6, PJRC.com LLC) manages the output of each of four pressure (i.e. pneumatic) regulators PR1, PR2, PR3 and PR4 through a respective digital potentiometer P1, P2, P3 and P4. The four DC-controlled pressure regulators PR1, PR2, PR3 and PR4 (ITV-1031, SMC Corp.) each supply regulated compressed air into a respective actuator array A1, A2, A3 and A4. The pressure regulators PR1, PR2, PR3 and PR4 are also equipped with electronic feedback systems that allow the facilitation of a closed-loop control, where the magnitudes of their pressure outputs are relayed into the microcontroller 1602, facilitating closed-loop control. A mass flow controller/sensor FL (FMA A2317, Omega Engineering) is used to maintain consistency of the exoskeleton's performance regardless of the characteristics of the primary pressure source. Two push buttons FS1, FS2 are added into the circuit, where both must be engaged concurrently in order for the exoskeleton to be operational. Releasing any of the buttons results in a drop in the set pressures of the regulators to 0 kPa. The two buttons FS1, FS2 act as fail-safe mechanisms that can ensure safe disengagement of the exoskeleton.

Figure 17:
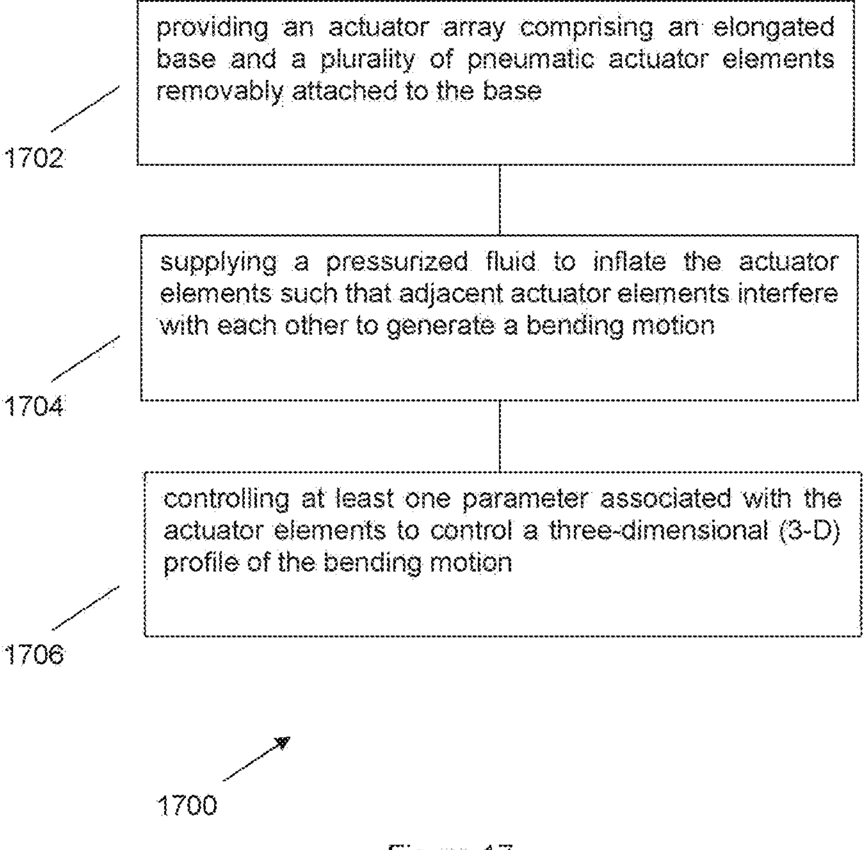
FIG. 17 shows a flow chart illustrating a method of generating a bending motion according to an example embodiment.

FIG. 17 shows a flow chart 1700 illustrating a method of generating a bending motion according to an example embodiment. At step 1702, an actuator array comprising an elongated base and a plurality of pneumatic actuator elements removably attached to the base is provided. The base comprises a pliant and inextensible material. At step 1704, a pressurized fluid is supplied to inflate the actuator elements such that adjacent actuator elements interfere with each other to generate a bending motion. The bending motion is supported by the base. At step 1706, at least one parameter associated with the actuator elements is controlled to control a three-dimensional (3-D) profile of the bending motion.

It will be appreciated by a person skilled in the art that numerous variations and/or modifications may be made to the present disclosure as shown in the specific embodiments without departing from the scope of the disclosure. For example, the number of actuator elements on each actuator array, or the number of actuator arrays, may be varied according to practical requirements. The present embodiments are, therefore, to be considered in all respects to be illustrative and not restrictive.

The invention claimed is:

1. An exoskeleton comprising, in combination:

a garment article wearable on a body of a user, having a base and a plurality of inflatable actuator elements attached to the base and arranged in proximity to form an array, wherein each of the plurality of inflatable actuator elements is independently removable from the base and is inflatable to an inflated position;

wherein at least one of the plurality of inflatable actuator elements collides against an adjacent inflatable actuator element when the inflatable actuator elements are in the inflated position; and the array comprises a first anterior actuator array configured to be mounted between a first midpoint on an anterior plane of a thigh of the user, traversing a line parallel to an axis of the thigh, and terminating just below a 10th rib of the user.

2. The exoskeleton of claim 1, wherein each of the plurality of inflatable actuator elements has a first mating part which is secured to a corresponding second mating part of the base, independently and removably securing each of the plurality of actuator elements to the base; and the exoskeleton is a fabric-based overall.

3. The exoskeleton of claim 2, further comprising a second anterior actuator array, with both the first anterior actuator array and the second anterior actuator array adapted to be positioned on an anterior side of the body of the user, and adapted to enhance stability a lower back of the user;

wherein the second anterior actuator array configured to be mounted between a first midpoint on an anterior plane of a second thigh of the user, traversing a line parallel to an axis of the second thigh, and terminating just below the 10th rib of the user.

4. The exoskeleton of claim 3, wherein the plurality of actuator elements in the inflated position combine to generate a combined resistive torque to support muscles of the body of the user; and a third actuator array configured to be positioned on a posterior side of the user, beginning at a second midpoint of the first thigh and extending to a lumbar spine, and a fourth actuator array configured to be positioned on the posterior side of the user, beginning at a second midpoint of the second thigh and extending to the lumbar spine.

5. The exoskeleton of claim 4, wherein the combined resistive torque is controllable by changing a shape, a size, a material elasticity or a spatial location, or any combination thereof, of one or more of the plurality of inflatable actuator elements.

* * * * *